United States Patent [19]

Muenger et al.

[11] 4,197,281

[45] Apr. 8, 1980

[54] PRODUCTION OF AMMONIA SYNTHESIS GAS FROM SOLID CARBONACEOUS FUELS

[75] Inventors: James R. Muenger, Beacon; Frank E. Guptill, Jr., Fishkill, both of N.Y.

[73] Assignee: Texaco Development Corporation, White Plains, N.Y.

[21] Appl. No.: 910,252

[22] Filed: May 30, 1978

Related U.S. Application Data

[63] Continuation of Ser. No. 641,863, Dec. 17, 1975, abandoned.

[51] Int. Cl.$^2$ ............................................. C01C 1/04
[52] U.S. Cl. .................................... 423/359; 423/351; 423/415 A; 423/648 R; 260/555 A; 423/420; 252/375
[58] Field of Search ............... 252/373, 374, 375, 376; 423/415 A, 420, 359, 648; 260/555 A; 48/210

[56] References Cited

U.S. PATENT DOCUMENTS

| | | | |
|---|---|---|---|
| 2,554,263 | 12/1946 | Nelson | 252/373 |
| 2,709,675 | 5/1955 | Phinney | 208/8 |
| 2,838,460 | 6/1958 | Stratford | 252/374 |
| 3,846,095 | 11/1974 | Crouch | 48/210 |
| 4,057,510 | 11/1977 | Crouch et al. | 252/376 |
| 4,060,397 | 11/1977 | Buiter et al. | 252/373 |

*Primary Examiner*—O. R. Vertiz
*Assistant Examiner*—Thomas W. Roy

*Attorney, Agent, or Firm*—Robert A. Kulason; Carl G. Ries; Albert Brent

[57] ABSTRACT

This is a continuous process for producing ammonia synthesis gas and includes the partial oxidation of particles of solid carboniferous fuels entrained in nitrogen. In the process, air is separated into high pressure nitrogen and substantially pure oxygen. A first stream of said nitrogen is used as a safe pneumatic vehicle in a grinding and transport operation which introduces ground, finely divided solid carbonaceous fuel into a venturi injector where the particles of solid fuel are dispersed in a second stream of said nitrogen. The solid fuel-nitrogen gaseous dispersion is then reacted with a free-oxygen containing gas preferably in the absence of supplemental $H_2O$, other than any moisture normally found in the reactants, in a freeflow partial oxidation synthesis gas generator. The nitrogen stream serves as a carrier for the particles of solid carbonaceous fuel and as a temperature moderator in the gas generator. After cleaning, shifting, and purifying the raw synthesis gas, a gaseous mixture of $N_2$ and $H_2$ is obtained having the proper stoichiometric proportions for ammonia synthesis. High pressure is preferably used in all of the steps of the process and in the catalytic ammonia synthesis which takes place subsequently. The high pressure is preferably the same as that produced in the gas generator less ordinary drop in the lines. Thus, expensive gas compressors may be avoided.

16 Claims, 1 Drawing Figure

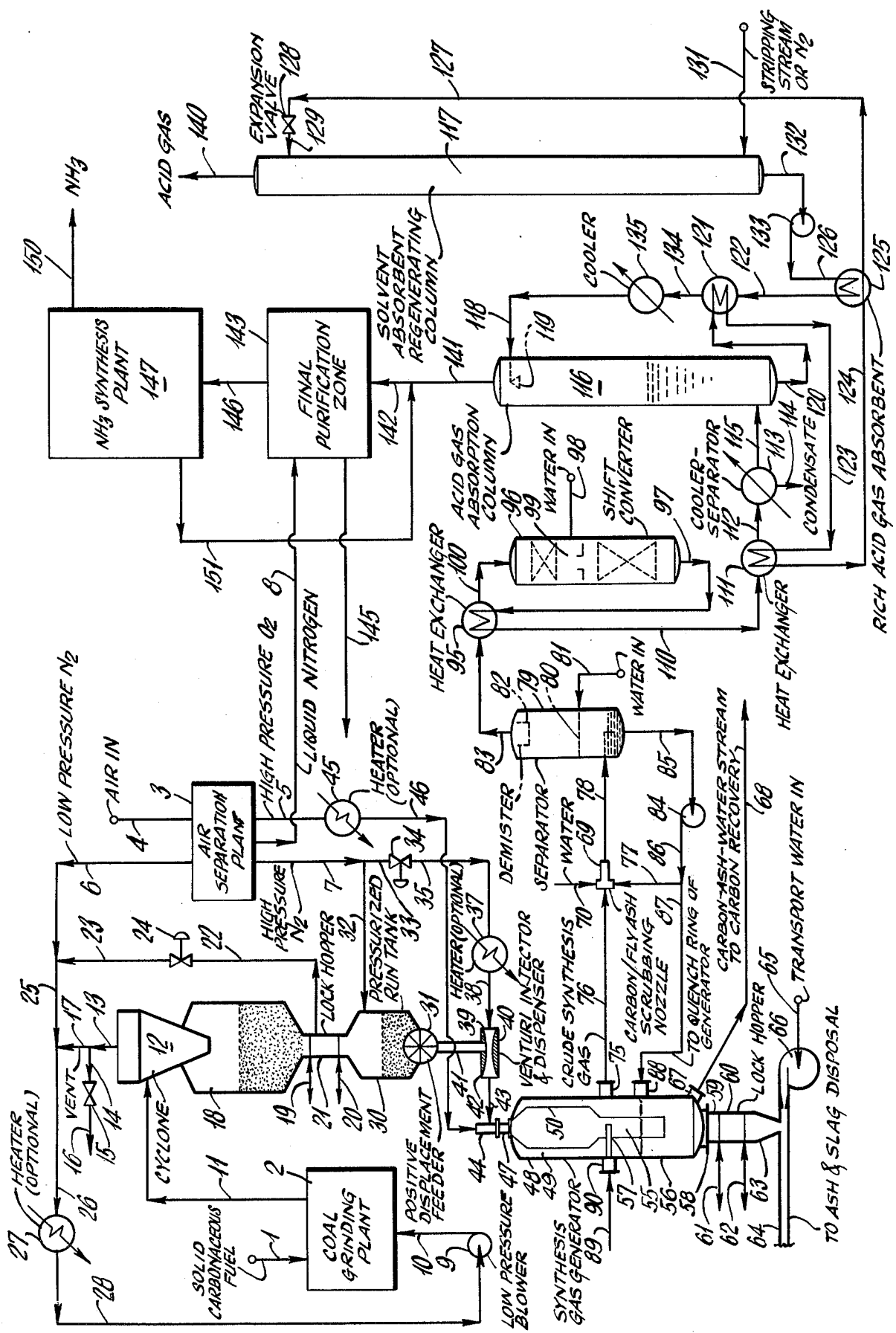

PRODUCTION OF AMMONIA SYNTHESIS GAS FROM SOLID CARBONACEOUS FUELS

This is a continuation, of application Ser. No. 641,863, filed Dec. 17, 1975, now abandoned.

BACKGROUND OF THE INVENTION

1. Field of the Invention

This invention relates to a continuous process for the production of ammonia synthesis gas. More specifically, the present invention relates to the production of ammonia synthesis gas by the partial oxidation of a gaseous dispersion of ground, solid carbonaceous fuel particles in nitrogen followed by cleaning, shifting, and purifying the process gas stream. The resulting ammonia synthesis gas is then catalytically reacted to produce ammonia.

2. Description of the Prior Art

Ammonia, as an industrial chemical, has become one of the largest volume chemicals. About 75–85% of ammonia production is used directly as fertilizer or in the manufacture of nitrogen fertilizers. The remaining ammonia production is used widely in such applications as in the production of explosives, intermediates for synthetic fibers, plastics, and animal feed products. It is also used in pulp and paper manufacture and in metallurgical processing.

Almost all synthetic ammonia is produced by reacting together 3 moles of pure hydrogen for each mole of nitrogen gas over a promoted iron catalyst. Conditions for ammonia synthesis include pressures that range from 100 to 1000 atmospheres and temperatures that range from 752° to 1202° F. Hydrogen may be obtained from such sources as: (1) decomposition of steam over hot lignite or coke to make water gas, (2) steam reforming of hydrocarbons, (3) electrolysis of water, and (4) partial oxidation of fossil carbonaceous fuels such as described in coassigned U.S. Pat. No. 2,838,460. Nitrogen may be obtained from (1) mixing produced gas with water gas before purification, (2) the liquefaction of air, or (3) burning hydrogen with air.

SUMMARY

By the subject continuous process, ammonia synthesis gas comprising 3 moles of hydrogen for each mole of nitrogen is produced by the partial oxidation of ground, solid carbonaceous fuel particles entrained in nitrogen. Preferably, no supplemental $H_2O$ is introduced into the gas generator other than any moisture which may ordinarily be in the reactants. Then, at a temperature in the range of about 752° to 1202° F. and a pressure in the range of about 100 to 1000 atmospheres, in a converter filled with conventional ammonia catalyst, e.g. promoted iron, the hydrogen and nitrogen in said synthesis gas may be reacted together to produce ammonia.

Included in the process are the following steps:

(1) separating air into a high pressure stream of free-oxygen containing gas and a separate high pressure stream of nitrogen in an air separation unit;

(2) introducing a first portion of said nitrogen stream into a size reduction zone to pneumatically transport the ground, solid carbonaceous fuel particles produced therein into a cyclone separator, removing low pressure nitrogen overhead from said cyclone separator and recycling at least a portion of said nitrogen to said size reduction zone;

(3) discharging said ground, solid carbonaceous fuel particles from the bottom of said cyclone separator through a holding tank, lock hopper, pressurized run tank, positive displacement feeding device, and then into a venturi injector where the particles of solid fuel are entrained in a second portion of said nitrogen to produce a solid fuel-nitrogen gaseous dispersion having a weight ratio of nitrogen to solid fuel in the range of about 0.3 to 0.9;

(4) introducing said solid fuel-nitrogen gaseous dispersion into the reaction zone of a free-flow partial oxidation gas generator simultaneously with a stream of said free-oxygen containing gas so that the atom ratio of oxygen supplied to carbon in said solid fuel is in the range of about 0.8 to 1.0;

(5) reacting said solid fuel and free-oxygen together by partial oxidation at a temperature in the range of about 1800° to 3000° F. and a pressure in the range of about 5 to 300 atmospheres (atm.) to produce a stream of raw synthesis gas comprising $H_2$, $CO$, $N_2$, $CO_2$, $H_2O$, particulate carbon, ash, $CH_4$, $H_2S$, $COS$, and A;

(6) cooling said raw synthesis gas and cleaning same by removing ash and particulate carbon, while introducing supplemental $H_2O$;

(7) reacting $H_2O$ and $CO$ in the process gas stream from (6) by water-gas shift to produce additional $H_2$ and $CO_2$ while simultaneously reacting $H_2$ and $COS$ to produce $H_2S$ and $CO$; and (8) drying and purifying the process gas stream from (7) thereby removing $H_2O$, $CO_2$, $CO$, $H_2S$, and optionally A and $CH_4$, and producing a gaseous mixture of $N_2$ and $H_2$ having the proper stoichiometric proportions for ammonia synthesis.

The process gas stream from step (8) is subsequently introduced into a catalytic reactor where, at a temperature in the range of about 752° to 1202° F. and a pressure in the range of about 100 to 1000 atmospheres, $N_2$ and $H_2$ are reacted together while in contact with a conventional ammonia synthesis catalyst, e.g. promoted iron, to produce $NH_3$.

DESCRIPTION OF THE INVENTION

In the subject process a solid carbonaceous fuel, for example coal, is ground to a small particle size and entrained in a stream of high pressure nitrogen. Typical grinds used for pulverized coal feed for power plant boilers are suitable. The resulting gaseous dispersion of solid fuel-nitrogen is then introduced into a conventional free-flow synthesis gas generator where partial oxidation takes place with a free-oxygen containing gas.

Unlike other partial oxidation processes employing a solid carbonaceous fuel as feed, preferably no supplemental $H_2O$ is introduced into the reaction zone other than the moisture, if any, which may normally be contained in the reactants.

The solid carbonaceous fuel employed in the subject process is selected from the group consisting of coal, coke from coal, coal char, petroleum coke, asphalt, particulate carbon, solid residues from processing hydrocarbon extracts from oil shale or tar sands, and mixtures thereof. With the exception of particulate carbon which has a particle size of less than 10 microns, all of the other solid carbonaceous fuels are typically ground to a particle size so that 100% of the material passes through an ASTM E 11-70 Sieve Designation Standard 425 $\mu$m (Alternative No. 40) and at least 80% passes through an ASTM E 11-70 Sieve Designation Standard 75 $\mu$m (Alternative No. 200), 1000 $\mu$m = 1 mm.

The coal may be any type, e.g. anthracite, bituminous and lignite. Coke from coal is the strong porous residue comprising carbon and mineral ash formed when coal, e.g. bituminous, is heated in the absence of air in a coke oven. Coal char may be made by the pyrolysis of coal at a temperature in the range of about 600° to 1600° F., with or without the presence of air, hydrogen or synthesis gas. For example, char may be produced in a fluidized bed retort; see coassigned U.S. Pat. No. 3,715,301. Petroleum coke consists of dehydrogenated and condensed hydrocarbons of high molecular weight in the form of a matrix of considerable physical extent. It principally comprises carbon and contains dispersed throughout a very minor amount of petroleum-based, asphaltic-like compounds. Raw petroleum coke suitable for use as a starting material in the process of this invention may be produced by the "delayed coking" process or by a similar process for converting heavy residual fuel oil into gasoline, gas oil, and coke. A typical delayed coking process is described in Kirk-Othmer Encyclopedia of Chemical Technology, 2nd Edition, Vol. 15, Inter-Science Publisher, 1968, pages 20–23. Calcined petroleum coke and fluid coke are also suitable as a starting material. Pitch is a black, amorphous solid or semi-solid residue obtained from the distillation of tars and tar products. The particulate carbon may be that which is obtained as a by-product of the subject partial oxidation process (to be further described) or that which is obtained by burning fossil fuels. Particulate carbon or free carbon soot may be recovered from the effluent gas stream from the partial oxidation gas generator where it may be found in the amount of about 0 to 20 weight percent (basis weight of carbon in the fuel). This particulate carbon is both oleophilic and hydrophobic. It has an Oil Absorption No. of more than 1, and usually one gram of particulate carbon will absorb 2–3 cc of oil.

The term "solid carbonaceous feedstock" also includes by definition hydrocarbonaceous and carbonaceous materials such as asphalt, rubber, rubber automobile tires, either alone or in admixture with each other or with said aforesaid group of materials, which have been ground or pulverized to the aforesaid sieve analysis. Any suitable conventional grinding system may be used to convert the solid carbonaceous fuels or mixtures thereof to the proper size.

Some typical solid carbonaceous fuels are described further in Table I.

TABLE I

TYPICAL SOLID CARBONACEOUS FUELS

|  | Coal | Bituminous Coal Coke | Coal Char | Petroleum Coke | Particulate Carbon |
|---|---|---|---|---|---|
| Proximate Analysis, Wt. % (dry) |  |  |  |  |  |
| Volatile Matter | 38.6 | 2.0 | 3.5 | 5.0 | 3.0 |
| Fixed Carbon | 50.0 | 88.0 | 76.4 | 94.3 | 93.0 |
| Ash | 11.4 | 10.0 | 20.1 | 0.7 | 4.0 |
| TOTALS | 100.0 | 100.0 | 100.0 | 100.0 | 100.0 |
| Ultimate Analysis Wt. % (dry) |  |  |  |  |  |
| C | 67.2 | 78.9 | 76.8 | 88.4 | 95.2 |
| H | 5.2 | 7.5 | 1.4 | 7.0 | 1.6 |
| N | 1.3 | 1.1 | 1.2 | 2.1 | 0.2 |
| S | 3.8 | 1.1 | 3.1 | 1.5 | 0.6 |
| O | 11.1 | 7.2 | 0.1 | 0.4 | — |
| Ash | 11.4 | 4.2 | 17.4 | 0.6 | 2.4 |

TABLE I-continued

TYPICAL SOLID CARBONACEOUS FUELS

|  | Coal | Bituminous Coal Coke | Coal Char | Petroleum Coke | Particulate Carbon |
|---|---|---|---|---|---|
| TOTALS | 100.0 | 100.0 | 100.0 | 100.0 | 100.0 |

The moisture content of the solid carbonaceous fuels as received at points of use can vary widely: for example, 2 to 10 wt. percent of dry weight for anthracite and bituminous coals, up to 30 wt. % for sub-bituminous coals, and even higher for lignites. Predrying may be required in some instances to reach a desirable moisture content, say below 20 wt. % or below 2.0 wt. %.

The pressurized feed system used herein to disperse the particles of solid carbonaceous fuel from a conventional grinder in a high pressure, high velocity stream of nitrogen having a pressure in the range of about 20 to 5000 psig and a velocity in the range of about 5 to 500 feet per second say 10 to 250 ft. per sec. includes a pneumatic transport system, gas-solids separator, a feed hopper, lock hopper, pressurized run tank, positive feed metering means, and a venturi injector.

In operation, a pneumatic transport system using nitrogen, which offers no explosion or fire hazard, as the carrier stream may be used to lift the finely divided solid carbonaceous fuel from the mills and to transport it to a gas-solids separator. Nitrogen gas is readily available as a by-product from a commercial air separation unit which produces substantially pure oxygen for reaction in the gas generator. For example, by the rectification of air, there is obtained a substantially pure oxygen fraction comprising at least 95 volume percent $O_2$ and a nitrogen fraction comprising in excess of 95 volume percent nitrogen, and preferably at least 98 vol. % purity. Optionally, the nitrogen carrier gas may be preheated to a temperature in the range of about 80° to 300° F. in order to assist in drying the ground, solid carbonaceous fuel during transport. A cyclone or series of cyclones may be used to disengage the carrier gas from the particles of solid fuel. The solid fuel particles then drop out of the bottom of the cyclone separator and into a feed hopper. The feed hopper is normally unheated and its pressure is essentially that of the supply system.

The particles of solid fuel drop by gravity first into a lock hopper and then into a pressurized run tank. The lock hopper is vented between cycles. Compressed nitrogen gas at a pressure in the range of about 20 to 5000 psig and a temperature in the range of about 80° to 300° F. is introduced into the top of the pressurized run tank. Vented nitrogen gas from the lock hopper may be recycled to a low pressure compressor suction or blower.

The ground, solid fuel drops from the bottom of the run tank into a positive displacement feeder which is used to meter the particles of solid fuel into a mixer. For example, a variable speed conveying screw or a star wheel may be used for metering the pulverized feed into one passage of a venturi injector while a stream of compressed and preferably preheated nitrogen gas is passed through the other passage of the jet mixer. A venturi or nozzle in the jet mixer provides a controlled but slight pressure gradient drop across the mixer which insures positive dumping of the mechanical feeder into the nitrogen carrier gas stream. Further, the venturi injector increases the gas velocity at the point of solids entry to disperse the solids well and rapidly. Alternatively, the pressure drop may be accomplished by means of a differential pressure controller on a throttling valve placed in the nitrogen gas stream line just upstream of a free-flow "T" mixer. The term "T" mixer as used herein is meant to mean the interconnection of a first conduit between the inlet end and discharge end of a straight conduit so that the angle of incidence is in the range of about 15° to 90°.

A thoroughly mixed dispersion of ground, solid carbonaceous fuel and nitrogen gas having a solids content in weight percent in the range of about 20 to 80 leaves the discharge end of the mixer. The dispersion of ground, solid fuel and nitrogen gas at a temperature in the range of about ambient to 1200° F., such as about 80° to 600° F., is then introduced into a free-flow partial oxidation, non-catalytic synthesis gas generator at a pressure in the range of about 20 to 5000 psig, preferably about 200 to 1500 psig.

The dispersion of nitrogen gas and solid carbonaceous fuel feed stream is thoroughly mixed and reacted with a stream of free-oxygen containing gas in the reaction zone of a free-flow, unpacked synthesis gas generator. Preferably, no supplemental $H_2O$ from an external source is introduced into the reaction zone, other than the relatively minor amount of $H_2O$ that may be present in the reactants. In one embodiment of the process, the solid carbonaceous fuel e.g. coal has a low moisture and ash content. In such case up to 0.15 lbs. of supplemental $H_2O$ per lb. of carbonaceous fuel may be introduced into the reaction zone in the form of water or steam to moderate the temperature in the reaction zone without introducing excess nitrogen.

The term free-oxygen containing gas includes substantially pure oxygen i.e. at least 95 mole % oxygen (the remainder comprising $N_2$ and rare gases), and air enriched with pure oxygen to the extent demanded by the system nitrogen-hydrogen balance i.e. at least 55 mole % $O_2$.

The nitrogen-solid carbonaceous fuel feed stream may be supplied to the reaction zone of the gas generator, preferably by way of the annulus passage of a suitable annulus-type burner such as shown in coassigned U.S. Pat. No. 2,928,460. Simultaneously, a stream of substantially pure oxygen or oxygen enriched gas is supplied to the reaction zone of the gas generator, preferably by way of the central passage in the burner, at a temperature in the range of about 80° to 500° F. and preferably in the range of about 200° to 300° F., and at a pressure above that in the reaction zone of the gas generator i.e. about 90 to 4600 psig.

In one embodiment of the process, the discharge end of the annulus-type burner assembly inserted into the reaction zone of the gas generator comprises an axially disposed center conduit through which a stream of substantially pure oxygen gas is passed, surrounded by an annular passage through which the stream of nitrogen gas-solid fuel mixture or dispersion is passed. Near the tip of the burner the annular passage converges inwardly to accelerate the nitrogen-solid feed stream and to deliver it as a conical sheet directed toward the central oxygen stream. The nitrogen-solid fuel feed stream may be thereby accelerated and discharged from the burner as a high velocity conical stream. As the high velocity stream of oxygen meets the lower velocity conical stream of the feed dispersion thorough mixing ensues and chemical reaction begins. The discharge velocity of the nitrogen-solid fuel feed dispersion from the burner may be in the range of about 25 to 100 feet per second (ft. per sec.) and suitably in the range of about 40 to 50 ft. per sec. at the burner tip.

The discharge velocity of the free-oxygen containing gas is in the range of about 110 ft. per sec. to 75% of sonic velocity at the burner tip, and preferably in the range of about 150 to 300 ft. per sec. Most suitably, the relative velocity difference between the aforesaid two streams being simultaneously discharged from the burner should be at least 100 ft. per sec. Further, the feed to the burner may be reversed. In such instance, said nitrogen-solid carbonaceous fuel feed dispersion is passed through the center passage while the substantially pure oxygen is passed through the annular passage of the burner.

The relative proportions of solid carbonaceous fuel, nitrogen, and free oxygen in the reaction zone of the gas generator are such as to ensure an autogenous temperature in the gas generation zone within the range of about 1800° to 3000° F., such as about 2200° to 2800° F., and to produce a particulate phase containing ash and about 0.1 to 20 wt. % of the organic carbon in the feed, and preferably about 1 to 4 wt. %. The particulate phase is entrained in the effluent gas stream leaving the reaction zone along with any noncombustible slag.

Other operating conditions in the gas generator include: pressure in the range of about 5 to 300 atm and preferably 20 to 200 atm.; the ratio of the atoms of free oxygen plus the atoms of organically combined oxygen in the solid carbonaceous fuel per atom of carbon in the solid carbonaceous fuel (O/C atomic ratio) may be in the overall range of about 0.7 to 1.2; weight ratio of nitrogen to carbon in the solid carbonaceous fuel feed in the range of about 0.2 to 1.0, and preferably in the range of about 0.4 to 0.8; and a time in the reaction zone in the range of about 1 to 10 seconds, and preferably in the range of about 1.5 to 4. Preferably, the partial oxidation of the solid carbonaceous fuel takes place in the reaction zone in the absence of a separate stream of supplemental $H_2O$, but not excluding the relatively small amount of $H_2O$ that may be present in the reactant streams. In one embodiment, $H_2O$ at a temperature in the range of about 50° to 1000° F. and in an amount to provide a weight ratio $H_2O$ to solid carbonaceous fuel in the range of about 0.01 to 0.15 is introduced into the reaction zone. This amount is well below the minimum weight ratio of $H_2O$/fuel commonly used with a solid or liquid fuel in a synthesis gas generator and may be introduced separately or in admixture with either of the two reactant streams. With substantially pure oxygen feed to the gas generator, the composition of the effluent gas from the gas generator in mole % dry basis may be as follows: $H_2$ 5 to 30; CO 35 to 70; $CO_2$ 4 to 20; $CH_4$ 0.01 to 3; $H_2S+COS$ 0 to 2; $N_2$ 5 to 25 and A nil to 0.5.

The hot gaseous effluent stream from the reaction zone of the synthesis gas generator is quickly cooled below the reaction temperature to a temperature in the range of 300° to 700° F. In one embodiment of the invention, the hot gaseous effluent stream is cooled below the reaction temperature by direct quenching with a water spray. For example, the cooling water may contact the effluent gas stream in a quench vessel or chamber located below the reaction zone of said gas generator. An interconnecting passage between the reaction zone and the quench zone through which the hot effluent gases may pass substantially equalizes the pressure in the two zones. Recycle water from the carbon recovery zone or clean carbon-water dispersion, to be further described, may be introduced through a spray ring at the top of the quench zone. Large quantities of steam are generated in the quench vessel and saturate the process gas stream. This provides the additional steam required for subsequent water-gas shift reaction.

Substantially all of the solids are scrubbed from the effluent gas. A dispersion of unconverted particulate carbon, ash, and quench water is thereby produced. Any residual solids in the cooled and scrubbed effluent synthesis gas leaving the quench chamber may be removed by means of a conventional venturi or jet scrubber, such as described in Perry's Chemical Engineers' Handbook, Fourth Edition, McGraw Hill Co., 1968, pages 18-55 to 56.

Noncombustible solid particles such as ash, slag, silt, metal constituents, metal silicates and other solids which do not disperse in the quench water drop to the bottom of the quench vessel where they are periodically removed through a lock hopper system. This residue has some commercial value and may be used as a soil improver, or it may be sent to a metals reclaiming unit. For example, coal ash may be removed from the flanged exit port at the bottom of the quench tank by way of the lock hopper system shown in the drawing. For each 100 pounds of raw ground coal fed to the gas generator, about 0 to 25 pounds of ash are produced. On a dry basis, the ash residue may comprise in wt. %: $SiO_2$ 10 to 50; $Al_2O_3$ 10 to 50; iron oxides and sulfides 0 to 40; and others.

Alternately, the hot effluent gas stream from the reaction zone of the synthesis gas generator may be partially cooled to a temperature in the range of about 300° to 650° F. by indirect heat exchange in a waste heat boiler. Most of the ash drops out of the effluent stream before entering the waste heat boiler, and after quenching is removed by a lock hopper. The remaining entrained solid particles may be then scrubbed from the effluent synthesis gas by contacting and further cooling the effluent stream of synthesis gas with quench water in a gas-liquid contact apparatus, for example, a spray tower, venturi or jet scrubber, bubble plate contactor, packed column, or in a combination of said equipment. For a detailed description of cooling synthesis gas by means of a waste heat boiler and a scrubbing tower, reference is made to coassigned U.S. Pat. No. 2,999,741, issued to R. M. Dille et al.

It may be important, with respect to the economics of the process, that the solid particles, e.g. particulate carbon and ash, be removed from the cooling and scrubbing water to permit the resulting clear water to be recycled and reused for cooling and scrubbing additional synthesis gas. This may take place in a liquid-solids separating zone. Alternately, a bleed stream may be removed from recirculated scrubbing water and disposed to settling ponds with material removed from the slag lock hopper.

In the liquid-solids separating zone any suitable method may be used for producing separate streams of clear water, ash, and particulate carbon. For example, a particulate carbon-ash-water dispersion may be introduced into a suitable standard gravity sedimentation unit or settler. Clear water is drawn off and recycled to the synthesis gas cooling and scrubbing zone. Froth flotation may be used to produce separate streams of ash and thickened slurry of carbon and water. The carbon-water slurry may be dried to produce relatively low ash, dry, solid particulate carbon which may be ground and recycled to the feed hopper as a portion of the solid carbonaceous fuel.

The clean process gas stream is next submitted to water-gas shift reaction in order to convert CO into $CO_2$ and to produce additional $H_2$. Thus, all or a portion of the scrubbed synthesis gas, with or without the addition of supplemental $H_2O$, may be reacted at a temperature in the range of about 600° to 1000° F. over a conventional water-gas shift catalyst, e.g. 85 wt. % $Fe_2O_3$ and 15 wt. % $Cr_2O_3$, to convert the CO into $H_2$ and $CO_2$. Alternatively, cobalt molybdate shift catalyst may be used. The shifted and unshifted portions of the process gas stream may be then combined. Simultaneously, substantially all of the COS in the gas stream reacts with $H_2$ to produce $H_2S$ and CO.

The process gas stream is then cooled to condense out and separate $H_2O$. Carbon monoxide, carbon dioxide and other acid gas constituents are removed next by conventional procedures, such as refrigeration and absorption with for example methanol. By this means, the dry process gas stream may be split into the following gaseous streams:

(a) a dry process gas stream substantially comprising $H_2$, $N_2$, CO, $CH_4$, and A. The composition of stream (a) in mole % dry basis may be about: $H_2$ 65 to 85; $N_2$ 6 to 27; CO 1 to 9; $CH_4$ 0.1 to 3; and A 0 to 0.6.

(b) a dry $CO_2$-rich gas stream having the following composition in mole %: $CO_2$ 70 to 95; $H_2$ nil to 20; $H_2S$ nil to 5 parts per million (ppm); $N_2$ 4 to 20; $CH_4$ nil to 0.6; and CO 1 to 4. This gas stream may be safely discharged to the atmosphere without causing pollution. In other embodiments of this invention this stream may be reacted with ammonia to produce urea or ammonium bicarbonate.

(c) a dry $H_2S$-rich gaseous stream comprising gases from the group $H_2S$, $N_2$, $CO_2$, and mixtures thereof. This gas stream may comprise substantially all of the $H_2S$ produced. The composition of this stream in mole % may be about: $H_2S$ 20 to 50; $N_2$ 0 to 5; and the balance $CO_2$. The dry $H_2S$-rich gaseous stream (c) may be sent to a conventional Claus unit where it is burned with air to produce solid sulfur by-product and water. Gas streams (b) and (c) may be mixed.

Process gas stream (a) is introduced into a final purification zone where any remaining $H_2O$, $CO_2$, CO, A and $CH_4$ are removed. This may be done by caustic scrubbing, cooling to condense water vapor, drying with alumina or silica gel, cooling to approximately $-315°$ F. and washing with liquid nitrogen in a contacting tower provided with bubble cap plates to insure intimate countercurrent contact between the liquid nitrogen and the gas stream. A substantial portion of the liquid nitrogen is vaporized and a roughly equal molar quantity of carbon monoxide plus smaller amounts of methane and argon are condensed in the balance of the liquid nitrogen wash which leaves from the tower bottom. The purified hydrogen-nitrogen gas leaving the tower at essentially the boiling point of nitrogen at a partial pressure approximately one-third that of the tower pressure is rewarmed against incoming tower gas by indirect heat exchange. For example, the gas leaving the tower will be approximately $-258°$ F. for a 750 psig synthesis gas or tower pressure. The compressed liquid nitrogen will be approximately $-316°$ F. at the point of entry. The $H_2/N_2$ mole ratio of the rewarmed purified gas may be adjusted to a value of 3 by a small addition of purified nitrogen, if necessary. In this manner, argon, carbon monoxide, and methane may be condensed by nitrogen flowing down the tower. Optionally, this condensate stream may be recycled to the gas generator. At the same time, liquid nitrogen may be vaporized into the process gas stream. If too much nitrogen is present, the excess may be removed by cooling and condensing. Alternately, carbon monoxide may be removed by such commerical processes as catalytic methanation, absorption in copper ammonium acetate absorbent, or by cryogenic separation.

The gas stream leaving the final purification zone is essentially free from components other than hydrogen and nitrogen. The volume ratio of $H_2$ to $N_2$ is 3. Less than about 0.4% argon and less than about 1 ppm carbon monoxide may be present. This gas stream is introduced into an ammonia synthesis plant as feed.

The equilibrium reaction for the synthesis of ammonia from its elements is shown in equation I:

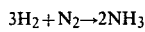
$$3H_2 + N_2 \rightarrow 2NH_3$$

$\Delta H$ at 500° C. and 200atm. = $-26,400$ cal/gram formula weight.

Equilibrium is favored by increased pressure and decreased temperatures. At a given temperature and pressure, the equilibrium ammonia concentration decreases linearly with an increasing concentration of inerts. The hydrogen to nitrogen mole ratio is in the range of about 2.5 to 3.5 such as 3.

Pressure in the ammonia synthesis reaction zone may be in the range of about 100 to 1000 atmospheres, such as the ranges of about 100 to 200 atmospheres, about 200 to 350 atmospheres, and about 900 to 1000 atmospheres. Preferably, the pressure in the ammonia synthesis reactor is the same as the pressure in the partial oxidation gas generator less ordinary drop in the lines and equipment. Expensive gas compressors may be thereby avoided.

Optionally, the pressure of the ammonia synthesis gas may be increased by a compressor or recirculator prior to being fed into the ammonia synthesis reaction zone.

The temperature in the ammonia synthesis reaction zone may be in the range of about 752° to 1202° F., such as the ranges of about 752° to 975° F., and about 930° to 1020° F.

Any suitable commercially available ammonia synthesis catalyst may be used in the subject process. Single and doubly-promoted iron catalysts are practical and give conversions of 8 to 40% of the gas after passage through a single converter.

Doubly-promoted catalysts may be made by melting in an electric furnace a pure grade of iron oxide, e.g. $Fe_3O_4$, together with an acidic or amphoteric oxide from the group aluminum oxide, zirconium dioxide, silicon dioxide. magnesium oxide, calcium oxide and titanium dioxide, plus an alkaline oxide such as potassium oxide. The melt is cooled, crushed to the desired particle size, and then reduced with hydrogen gas. A porous iron containing well-distributed promoter materials is thereby produced. A typical catalyst formulation of this type comprises in wt. %: $K_2O$ 0.35; $Al_2O_3$ 0.84; and the remainder Fe.

The standard size of catlyst is about 6 to 10 mm. Radial flow converters may use about 1½ to 6 mm sized catalyst to take advantage of the increased activity.

Ammonia synthesis converters are alloy steel pressure vessels provided internally with a catalyst container and means for dissipating the heat evolved by the highly exothermic synthesis reaction.

The optimum space velocity is set according to many factors. For example, high space velocities tend to minimize the reactor size but mean increased pressure drop, more compression horsepower, and higher refrigeration loads. Further, ammonia conversion decreases with increasing space velocity. Normally, space velocities range from about 5000 to 50,000 Standard Cubic Feet of Reactants per Cubic Feet of Catalyst per Hour (v/v/hr.).

Other embodiments of the subject process pertain to reacting at least a portion of the ammonia and $CO_2$ produced in the system. Thus, previously described dry $CO_2$ stream (b) may be reacted with ammonia produced in the subject process at a pressure in the range of about 120-200 atm. and a temperature in the range of about 320°-356° F. to produce urea as shown in equation II:

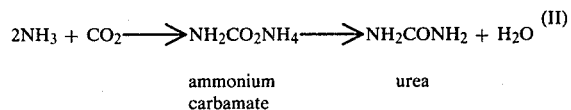
$$2NH_3 + CO_2 \longrightarrow NH_2CO_2NH_4 \longrightarrow NH_2CONH_2 + H_2O \quad (II)$$

ammonium carbamate      urea

Urea is one of the components of urea-formaldehyde.

Ammonium bicarbonate, $NH_4HCO_3$, is readily prepared by passing gaseous carbon dioxide stream (b) through an aqueous ammonia solution in an absorption column or packed tower as shown in equation III:

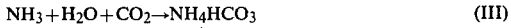
$$NH_3 + H_2O + CO_2 \rightarrow NH_4HCO_3 \quad (III)$$

Crystals of ammonium bicarbonate precipitate from the saturated solution and are filtered, washed, and dried. Ammonium bicarbonate is used as an ingredient of baking powder and fire-extinguishing compositions.

In still another embodiment, ammonium carbonate, $(NH_4)_2CO_3$, may be prepared by passing $CO_2$ stream (b) into an aqueous solution of ammonia (produced in the subject process) in a column and causing the vapors, consisting of ammonia, carbon dioxide, and water vapor, to distill off and subsequently condense to a solid crystalline mass. It is used as a baking powder ingredient.

DESCRIPTION OF THE DRAWING

A more complete understanding of the invention may be had by reference to the accompanying schematic drawing which shows the previously described process in detail. Although the drawing illustrates a preferred embodiment of the process of this invention, it is not intended to limit the continuous process illustrated to the particular apparatus or materials described.

With reference to the drawing, solid carbonaceous fuel from line 1 is ground typically to a particle size so that 100% of the material passes through an ASTM E 11-70 Sieve Designation Standard 425 $\mu$m (Alternative No. 40) and at least 80% passes through an ASTM E 11-70 Sieve Designation Standard 75 $\mu$m (Alternative No. 200) in a grinding or pulverizing plant 2. In a conventional air separation unit 3, air from line 4 is split into substantially pure oxygen (95 mole % $O_2$ or more) at a pressure in the range of about 30 to 300 atm., which leaves by way of line 5 and into three streams of nitrogen, i.e. a gaseous stream of low pressure nitrogen (3 to 5 atm.) in line 6, a gaseous stream of high pressure nitrogen (30 to 300 atm.) in line 7, and a liquid stream of nitrogen in line 8. By means of blower 9, nitrogen preferably at a temperature of about 100° F. higher than ambient, is passed through line 10 to lift the particles of solid fuel from the grinding mills and to transport them through line 11 to centrifugal cyclone separator 12 or to a series of cyclones. Nitrogen and water vapor are disengaged from the gas-solid dispersion and may be vented via line 13 at the top of the cyclone separator. A portion of the vent stream may be exhausted to the atmosphere through line 14, valve 15, and line 16 in order to carry off vaporized moisture; and the remainder of the vent stream may be recycled through lines 17, 26, heater 27 (optional) and line 28, blower 9 and line 10. Simultaneously, the dry ground solid carbonaceous fuel particles drop from the bottom of the cyclone into feed hopper 18.

Slide valves 19 and 20 control the flow of the solid fuel from the bottom of feed hopper 18 into lock hopper 21. During the filling and emptying of lock hopper 21 by operating valves 19 and 20, lines 22–23 and valve 24 serve to cyclically vent nitrogen gas from lock hopper 21 in conjunction with the operation of valves 19 and 20. This vent stream of nitrogen is recycled to blower or compressor 9 by way of lines 25–26, heater 27 (optional), and line 28. Make-up nitrogen is obtained from line 6.

Pressurized run tank 30 keeps positive displacement feeder 31 continously supplied with ground solid carbonaceous fuel. High pressure nitrogen gas is passed through lines 7 and 32 into pressurized tank 30. A second portion of said high pressure nitrogen gas is passed through line 33, throttling valve 34, line 35, heater 37 (optional), line 38, and into the straight angle passage 39 of venturi injector 40. Simultaneously, ground solid carbonaceous fuel is fed into the normal passage 41 of venturi injector 40 by means of feeder 31.

A thoroughly mixed dispersion of ground solid carbonaceous fuel in nitrogen gas is discharged at 42 and is passed through line 43 into the annular passage (not shown) of annulus-type burner 44. Simultaneously, a stream of substantially pure oxygen from line 5 is passed through heater 45 (optional) and line 46 into the central passage (not shown) of burner 44. Optionally, additional feed materials such as fuels, temperature moderator or fluxing agents may be passed through burner 44 either in admixture with the aforesaid feed streams or separately by way of an outer annulus passage (not shown) in burner 44. Optionally, the feed streams may be interchanged. For example, the stream of free oxygen-containing gas may be passed through the annular passage and the other reactant stream may be passed through the central passage of burner 44.

Burner 44 is mounted in the upper axially-aligned flanged inlet 47 of vertical free-flow synthesis gas generator 48. As previously described, gas generator 48 is a vertical steel pressure vessel. It has a refractory lining 49 and an unobstructed reaction zone 50. The effluent gas leaving the reaction zone passes into a gas cooling zone where it may be cooled by direct or indirect heat exchange with a coolant, e.g. water. For example, the gas stream may be passed through passage 55 and into water contained in a quench zone such as quench tank 56. On the way, the gas stream may be sprayed with water from spray ring 57. Thus, water in the quench zone cools the effluent gas stream and scrubs out most of the solid particles, i.e. ash and soot. Ash containing some fine particulate carbon particles settles to the bottom of quench tank 56 and may be removed periodically through axially-aligned bottom flanged outlet 58, passage 59, and a lock hopper system comprising hopper 60, slide valves 61 and 62, and passage 63 which discharges into line 64 through which water from line 65 is pumped by means of pump 66. The larger particles of soot may form a carbon-water slurry which may be removed from quench zone 56 by way of flanged outlet 67 and line 68. The carbon-water slurry may be sent to a carbon recovery system (not shown) such as a settler where clean water is separated and recycled to scrubbing nozzle 69 by way of line 70. Optionally, clean make-up water may be introduced through line 70. Optionally, the particulate carbon from the carbon recovery zone is dried, ground, and introduced into hopper 18. Alternately, the carbon-water slurry may be used as a transport medium for the ash and slag entering line 64 through passage 63.

A saturated process gas stream of crude synthesis gas is removed through flanged exit port 75 near the top of quench zone 56 and passed through line 76 into scrubbing nozzle 69. Any remaining particulate carbon or entrained solids is scrubbed from the process gas stream in scrubbing nozzle 69 with water from line 70 and a carbon-water dispersion from line 77. The mixture of process gas and water leaving scrubbing nozzle 69 by way of line 78 is passed into gas-liquid separator 79. Separated gas may pass up through spray 80 where it may be scrubbed with fresh water from line 81. Excess water is removed with demister 82 and the clean gas stream leaves through line 83. By means of pump 84, a carbon-water stream may be pumped through lines 85, 86 and 77 into orifice scrubber 69, as mentioned previously. Optionally, another portion of carbon-water dispersion is pumped through line 87 and flanged inlet 88 into quench zone 56. Another portion of said carbon-water stream is preferably pumped through line 89, flanged inlet 90, and spray ring 57 into quench zone 56.

Clean process gas saturated with $H_2O$ from line 83 at the top of separator 79 is passed through heat exchanger 95. There it is heated to a temperature in the range of about 500° to 700° F. by indirect heat exchange with a process gas stream leaving two-stage catalytic water-gas shift converter 96 through line 97 at a temperature in the range of about 550° to 750° F. Water from line 98 is introduced into the process gas stream in space 99 in between the two beds of water-gas shift catalyst situated in shift converter 96. This is to control the exothermic reaction going on in the shift converter. The preheated process gas stream from heat exchanger 95 enters the first catalyst bed through line 100 at the top of the shift converter 96 and flows serially down through the two catalyst beds.

After being cooled in heat exchanger 95, as previously described, the process gas stream passes through line 110, heat exchanger 111, line 112, and cooler-separator 113 where it is cooled to a temperature below the dew point to condense substantially all of the $H_2O$ from the gas stream. The condensed water is removed through line 114. Then, the dry process gas stream is passed through line 115 into the bottom of acid gas scrubbing tower 116 in the gas purification and separation zone.

Included in the gas purification and separation zone may be the following equipment: tray-type acid gas scrubbing tower 116 where the process gas stream is scrubbed with at least one solvent absorbent, e.g. methanol; related absorbent regenerator 117; and various associated, valves, pumps, coolers, heat exchangers, and reboilers.

The process gas stream entering through line 115 into the bottom of acid gas scrubbing tower 116 is scrubbed with liquid solvent absorbent that enters the tower through line 118 and is distributed by sparger 119. Rich liquid solvent absorbent containing most of the $CO_2$ and $H_2S$ produced in the process plus any COS remaining after shift are removed from the bottom of tower 116 through line 120 and then passed into heat exchanger 121 to precool lean absorbent from line 122. The rich absorbent is then passed through line 123 and heat exchanger 111 to precool the shifted gases from line 110. The rich absorbent stream in line 124 is then passed through heat exchanger 125 to precool the lean absorbent from line 126. The rich absorbent stream is then passed through line 127, expansion valve 128, and line 129 into the top of absorbent regenerating column 117. As the rich absorbent liquid stream descends in column 117, it contacts a stream of stripping steam or nitrogen which enters the column from line 131 and passes up the column through openings in bubble caps in the plurality of plates. Condensed lean liquid absorbent substantially free from $H_2S$, COS, and $CO_2$ is removed through line 132. This regenerated lean liquid stream is recycled to acid gas scrubbing tower 116 by means of pump 133 through line 126, heat exchanger 125, line 122, heat exchanger 121, line 134, cooler 135, and line 118. A process gas stream containing gases from the group $H_2S$, COS, $CO_2$, and mixtures thereof, leaves from line 140 at the top of regenerator 117 and may be sent to a Claus unit for the production of by-product solid sulfur.

Alternatively, two solvent absorbent regenerating columns may be employed to produce a $CO_2$-rich gas stream and a separate $H_2S$-rich gas stream. In such case, regenerating column 117 may be operated so that a $CO_2$-rich gas stream leaves from line 140. For example, a reboiler (not shown) may be employed in connection with column 117 plus an expansion valve to flash off a dry $CO_2$-rich gas stream from the rich solvent absorbent. The composition of the $CO_2$-rich gas stream has been given previously. The liquid solvent absorbent containing dissolved $H_2S$ and any COS is removed from the bottom of column 117 and introduced into a second solvent absorbent regeneration column (not shown) equipped with a reboiler. An $H_2S$-rich gas stream, as previously described, is removed from the top of the second regeneration column, and lean methanol is removed from the bottom. This gas stream may be sent to a Claus unit for the production of by-product sulfur.

The lean liquid solvent absorbent from the bottom of the second regeneration column is recycled to the acid gas absorption column 116.

Final purification of the process gas stream in lines 141 and 142 is accomplished in final purification zone 143. Any remaining $H_2O$, $CO_2$, CO, A and $CH_4$ are removed in zone 143 by a combination of conventional procedures (not shown), e.g. caustic scrubbing, cooling to condense water vapor, drying with alumina or silica gel, cooling to low temperature in the range of about $-250°$ to $-315°$ F., and washing with liquid nitrogen from line 8 at a temperature of $-320°$ F. and a pressure in the range of about 5 to 300 atm., depending upon the pressure level of gas generator 48 and the pressure drops in the synthesis gas system, in a wash tower. Condensed argon, carbon monoxide and methane may leave purification zone 143 by way of line 145 and may be optionally recycled to the gas generator.

The purified process gas stream leaving purification zone 143 by way of line 146, and substantially comprising 3 parts by volume of $H_2$ to 1 part by volume of $N_2$, is introduced into a conventional ammonia synthesis plant 147. By the catalytic reaction of $N_2$ and $H_2$, ammonia ($NH_3$) is produced. Any conventional ammonia synthesis catalyst may be used, e.g. promoted iron. Synthetic ammonia leaves the synthesis reactor by way of line 150. Optionally, a bleed stream of recycle ammonia synthesis gas may be recycled to the final purification zone through lines 151 and 142 to control any build-up of inert materials in the ammonia synthesis loop.

Ammonia synthesis plant 147 is equipped with recirculation pumps (not shown) for the synthesis gas. Preferably, synthesis gas generator 48 may be operated at a sufficiently high pressure so that costly gas compressors may be eliminated. Optionally, the pressure of the ammonia synthesis gas may be increased by a compressor (not shown).

EXAMPLE

The following example illustrates a preferred embodiment of the process of this invention. While a preferred mode of operation is illustrated, the example should not be construed as limiting the scope of the invention. The process is continuous and the flow rates are specified on an hourly basis for all streams of materials.

A stream of 136,000 pounds of dry bituminous coal is ground to a particle size so that 100% of the material passes through an ASTM E 11-70 Sieve Designation Standard 425 $\mu$m (Alternative No. 40) and at least 80% passes through an ASTM E 11-70 Sieve Designation Standard 75 $\mu$m (Alternative No. 200). By means of a nitrogen pneumatic transport system the coal particles are passed successively through a cyclone separator, feed hopper, lock hopper, and pressureized run tank, as previously described. A positive displacement metering device, such as a star wheel, is then employed to give a controllable rate of delivery and a uniform delivery of the coal particles into the throat of a venturi injector and dispenser. Slide valves or other types of valves may be used to control the flow of fuel particles into the lock hopper.

The particles of solid fuel are introduced into a jet mixer and dispersed in a high pressure, high velocity stream of 970,000 standard cubic feed (SCF) of high pressure nitrogen gas (99.5 mole % $N_2$) obtained from an air separation plant. The temperature of the high pressure $N_2$ gas stream is 300° F., the pressure is 850 psig, and its velocity is 200 ft. per sec. The ultimate analysis of the coal in wt. % is: C 69.76; H 4.50 N 1.03; S 1.03; and O 13.90. The ash content is 9.78 wt. %.

The dispersion of ground coal and nitrogen gas is passed through the annular passage of an annular-type burner and into the reaction zone of a free-flow synthesis gas generator at a velocity of about 100 ft. per sec. at the burner tip. The burner is axially mounted in the upper flanged inlet of the gas generator. Simultaneously, a stream of 1,079,000 SCF of substantially pure oxygen (99.5 mole %) at a temperature of about 300° F. is passed through the center passage of said burner and leaves at the burner tip at a velocity of about 275 ft. per sec. The two streams impinge against each other in the reaction zone producing a uniform dispersion of oxygen, coal particles, and nitrogen.

The gas generator is an unobstructed refractory lined pressure vessel and may contain no catalyst other than that which might be naturally found in the coal. A typical gas generator having an upper reaction chamber, a lower quench chamber, and an axial passage through which the effluent gas stream from the reaction chamber may pass into water in the quench chamber is shown in the drawing.

In the reaction zone, the atomic ratio of oxygen in the substantially pure oxygen plus the combined organic oxygen in the coal to carbon in the coal is about 0.922; the weight ratio of nitrogen to coal is about 0.52; the temperature is about 2525° F.; and the pressures is about 765 psia. The coal particles are reacted with oxygen by partial oxidation. The nitrogen gas serves as a carrier for the coal particles and as a temperature moderator.

The effluent gas from the reaction zone is cooled and cleaned in a quench zone by passing it through a water spray and into quench water in the lower quench chamber of the gas generator. The water spray and scrubbing action that occurs as the effluent gas passes through the quench zone scrubs out most of the ash and particulate carbon soot. A 2 wt. % carbon-ash-water is drawn off from the bottom of the quench tank and sent to a separation zone. Clear water is separated and used for additional gas scrubbing. About 6400 pounds of relatively low ash particulate carbon soot is recovered and dried by conventional means. Optionally, this dry soot and ash may be admixed with the dry fresh ground coal feed to the slurry tank, or it may be admixed with feed to the grinding system. About 9880 pounds of ash having the following composition in wt. % are removed periodically from the bottom of the quench zone by way of a lock hopper system: ash 82; C 16.8; H 0.2; S 1.0.

The process gas stream leaving the quench zone is saturated with steam, and it is at a temperature of about 430° F. and a pressure of 760 psia. About 640 pounds of soot are removed from this gas stream by scrubbing with water in a conventional orifice scrubber. By the aforesaid process, about 9,315,000 SCF of process gas is produced containing about 4,855,000 SCF of steam and having the following dry composition in mole %: CO 47.5; $H_2$ 23.5; $CO_2$ 6.1; $CH_4$ 0.4; $H_2S$ 0.3; COS 0.0; A 0.1; and $N_2$ 22.1.

The process gas stream is heated to a temperature of about 550° F. by indirect heat exchange with the effluent gas leaving a conventional water-gas shift converter filled with cobalt-molybdenum shift catalyst. The heated feed gas is passed sequentially through two beds of said water-gas shift catalyst. Water is injected into the process gas stream flowing between the first and second beds to control the temperature. Space velocities are about 1500 standard volumes of gas per volume of catalyst per hour (v/v/hr.) in the first bed and 600 v/v/hr. in the second bed. The exit temperature of the process gas stream is about 565° F. By heat exchange, the process gas stream is reduced to a temperature below the dew point, i.e. about 150° F. After water is removed, the process gas stream has the following composition: CO 1.7; $H_2$ 47.3; $CO_2$ 35.2; $CH_4$ 0.3; $H_2S$ 0.2; COS 0.0; A 0.1; and $N_2$ 15.2.

The process gas stream is then cooled and processed in an acid gas absorption column with a methanol solvent. 4,198,000 SCFH of the insoluble process gas stream leaves from the top of the acid gas absorption column comprising in mole %: $H_2$ 73.2; CO 2.6; $N_2$ 23.5; A 0.2; and $CH_4$ 0.5. This process gas stream is then introduced into a final purification zone where by conventional procedures, as previously described, substantially all of the impurities are removed, producing a mixture of $N_2$ and $H_2$. A liquid nitrogen wash is included in the final purification zone, and some nitrogen vaporizes into the process gas stream. The process gas stream leaving the final purification zone at a pressure of about 41.5 atm. comprises an ammonia synthesis feed mixture comprising 3 volumes of hydrogen per volume of nitrogen. About 4,086,000 SCF of this ammonia synthesis feed gas mixture is heated to a temperature of about 900° F. and is introduced into a conventional ammonia synthesis plant where it is reacted while in contact with a conventional ammonia synthesis catalyst, e.g. doubly-promoted iron. The pressure in the reaction zone is 120 atm. About 91,510 pounds of anhydrous liquid ammonia are thereby produced.

The rich methanol solvent from the bottom of the acid gas absorption column is regenerated by flashing, reboiling, stripping, or a combination thereof. 2,388,000 SCFH of $CO_2$-rich gas stream is produced, comprising in mole % $CO_2$ 95.0, $H_2$ 0.72 and CO 0.52; $CH_4$ 0.11; $N_2$ 3.63 and 32,440 SCFH of an $H_2S$-rich gas stream, comprising in mole % $H_2S$ 40.1, $CO_2$ 59.3 and $N_2$ 0.6, is produced. At least a portion of the $CO_2$-rich gas stream may be reacted with a portion of the ammonia product to produce urea. The $H_2S$-rich gas stream may be sent to a Claus unit for the production of sulfur.

The process of the invention has been described generally and by example with reference to a nitrogen gas-solid carbonaceous fuel feedstock of particular compositions for purposes of clarity and illustration only. It will be apparent to those skilled in the art from the foregoing that the various modifications of the process and the materials disclosed herein can be made without departure from the spirit of the invention.

We claim:

1. A process for producing synthesis gas from solid carbonaceous fuel comprising:
    (1) separating air into a high pressure stream of free-oxygen containing gas selected from the group substantially pure oxygen containing at least 95 mole % oxygen, and oxygen-enriched air containing at least 55 mole % oxygen, and a separate stream of nitrogen by means of an air separation unit;
    (2) introducing a first portion of said nitrogen stream at low pressure into a size reduction zone to pneumatically transport ground, solid carbonaceous fuel particles produced therein into a gas-solid separator, wherein said solid carbonaceous fuel is selected from anthracite and bituminous coal having a moisture content in the range of about 2 to 10 weight percent, and sub-bituminous coal and lignite having a moisture content up to 30 weight percent; removing low pressure nitrogen gas overhead from said gas-solid separator and recycling at least a portion of said nitrogen to said size reduction zone;
    (3) discharging said ground, solid carbonaceous fuel particles from said separator and passing said material into a storing, feeding and mixing zone where the particles or solid fuel are entrained in a second portion of said nitrogen from (1) at high pressure to produce a solid fuel-nitrogen gaseous dispersion having a weight ratio of nitrogen to carbon in the solid fuel in the range of about 0.2 to 1.0;
    (4) introducing said solid fuel-nitrogen gaseous dispersion by way of an annulus-type burner at a velocity in the range of about 25 to 100 feet per second downwardly into the reaction zone of a single free-flow partial oxidation non-catalytic gas generator simultaneously with a stream of said free-oxygen containing gas which is passed downwardly through said burner at a velocity in the range of about 110 feet per second to 75% of sonic velocity, said streams impinging against each other in the reaction zone producing a uniform dispersion of free-oxygen containing gas, solid fuel particles, and nitrogen, and the ratio of the atoms of free-oxygen plus the atoms of organically combined oxygen in the solid carbonaceous fuel per atom of carbon in the solid carbonaceous fuel is in the range of about 0.7 to 1.2; wherein no supplemental $H_2O$ is introduced into the reaction zone other than that which may be normally contained in said reactants;
(5) reacting said solid fuel and free-oxygen containing gas together by partial oxidation at a temperature in the range of about 1800° to 3000° F. and a pressure in the range of about 5 to 300 atmospheres to produce a stream of raw synthesis gas comprising $H_2$, CO, $N_2$, $CO_2$, $H_2O$, particulate carbon, ash, $CH_4$, $H_2S$, COS, and A; and
(6) cooling said raw synthesis gas and cleaning same by removing ash and particulate carbon.

2. The process of claim 1 with the added step of introducing supplemental $H_2O$ from an external source into the reaction zone in step (4) in the amount up to 0.15 lbs. of $H_2O$ per lb. of carbonaceous fuel.

3. A process for producing ammonia synthesis gas from solid carbonaceous fuel comprising:
(1) separating air into a high pressure stream of substantially pure oxygen containing at least 95 mole % oxygen, and a separate stream of nitrogen having a purity of at least 98 vol. % by means of an air separation unit;
(2) introducing a first portion of said nitrogen stream at low pressure into a size reduction zone to pneumatically transport ground, solid carbonaceous fuel particles produced therein into a gas-solid separator, removing low pressure nitrogen gas overhead from said separator and recycling at least a portion of said nitrogen to said reaction zone; wherein said solid carbonaceous fuel is selected from anthracite and bituminous coal having a moisture content in the range of about 2 to 10 weight percent, and sub-bituminous coal and lignite having a moisture content up to 30 weight percent, and said ground solid fuel has a particle size so that 100% passes through an ASTM E11-70 Sieve Designation Standard 425 $\mu m$ and at least 80% passes through an ASTM E11-70 Seive Designation Standard 75 $\mu m$;
(3) discharging said ground, solid carbonaceous fuel particles from said separator into a lock hopper from which low pressure nitrogen gas is discharged, passing said particles of solid fuel into a run tank that is pressurized by a separate portion of nitrogen gas from (1) at high pressure, and metering the particles of solid fuel from said run tank into a mixing zone, and mixing and entraining said said particles of solid fuel in a second portion of said nitrogen from (1) at high pressure to produce a solid fuel-nitrogen gaseous dispersion having a weight ratio of nitrogen to carbon in the solid carbonaceous fuel is in the range of about 0.2 to 1.0;
(4) introducing a stream of said solid fuel-nitrogen gaseous dispersion downwardly into the reaction zone of a single free-flow partial oxidation non-catalytic gas generator by way of the annulus passage of an annulus-type burner at a velocity in the range of about 25 to 100 feet per second simultaneously with a stream of said substantially pure oxygen which is passed downwardly through the center conduit of said burner at a velocity in the range of about 110 feet per second to 75% of sonic velocity, said streams impinging against each other in the reaction zone producing a uniform dispersion of oxygen fuel particles, and nitrogen, and the ratio of the atoms of free-oxygen plus the atoms of organically combined oxygen in the solid carbonaceous fuel per atom of carbon in the solid carbonaceous fuel is in the range of about 0.7 to 1.2;
(5) reacting said solid fuel and oxygen together by partial oxidation at a temperature in the range of about 1800° to 3000° F. and a pressure in the range of about 5 to 300 atmospheres (atm.) and a residence time in the range of about 1 to 10 seconds to produce a stream of raw synthesis gas comprising in mole % dry basis: $H_2$ 5 to 30, CO 35 to 70, $N_2$ 5 to 25, $CO_2$ 4 to 20, $CH_4$ 0.01 to 3.0, $H_2S$ plus COS 0 to 2, A nil to 0.5, and containing $H_2O$, particulate carbon, and ash;
(6) cooling said raw synthesis gas and cleaning same by removing ash and particulate carbon, while introducing supplemental $H_2O$;
(7) reacting $H_2O$ and CO in the process gas stream from (6) by water-gas shift to produce additional $H_2$ and $CO_2$, while simultaneously reacting $H_2$ and COS to produce $H_2S$ and CO; and
(8) drying and purifying the process gas stream from (7); thereby producing an ammonia synthesis gas stream comprising $N_2$ and $H_2$ in the proper stoichiometric ratio for catalytic reaction together to produce ammonia.

4. The process of claim 3 provided with the additional step of introducing the process gas stream from step (8) into a catalytic reactor where, at a temperature in the range of about 250° to 1202° F. and a pressure in the range of about 100 to 1000 atm., $N_2$ and $H_2$ are reacted together to produce $NH_3$.

5. The process of claim 3 wherein supplemental $H_2O$ is introduced into the reaction zone in the amount of 0 to 0.15 lbs. of $H_2O$ per lb. of carbonaceous fuel.

6. The process of claim 3 wherein the atom ratio of free-oxygen in said substantially pure oxygen to carbon in said solid fuel is in the range of about 0.8 to 1.0.

7. The process of claim 3 wherein purifying the process gas stream in step (8) includes washing the process gas stream with a third portion of said nitrogen, at a temperature of −316° F. and removing condensed CO, $CH_4$, and A; and wherein the amount of $N_2$ added to the process gas stream is such that about 3 moles of hydrogen are present in the process gas stream per mole of nitrogen.

8. The process of claim 4 wherein the pressure in said catalytic reaction is substantially the same as that in the gas generator in step (4) less ordinary pressure drop in the lines.

9. The process of claim 4 with the additional step of compressing the ammonia synthesis gas stream prior to introduction into said catalytic reactor.

10. The process of claim 3 wherein said solid carbonaceous fuel is selected from the group consisting of coal, coke from coal, coal char, petroleum coke, asphalt, particulate carbon, solid residues from processing hydrocarbon extracts from oil shale or tar sands, and mixtures thereof.

11. The process of claim 3 where the solid fuel-nitrogen gaseous dispersion from step (3) has a solids content in the range of about 20 to 80 weight percent.

12. The process of claim 4 with the added steps of reacting stoichiometric amounts of said product ammonia with said $CO_2$ gas recovered during the purifying of the raw synthesis gas at a pressure in the range of about 120-200 atm. and a temperature in the range of about 320°-356° F. to produce urea and water, and separating said urea from said water.

13. The process of claim 4 with the added steps of passing $CO_2$ gas recovered during the purifying of the raw synthesis gas through aqueous ammonia solution in an absorption zone to precipitate ammonium bicarbonate, and filtering, washing, and drying said ammonium bicarbonate.

14. The process of claim 3 provided with the step of predrying to a moisture content of below 20 weight % the solid carbonaceous fuel feed to the size reduction zone in step (2).

15. A process for producing urea from solid carbonaceous fuel comprising:
(1) separating air into a high pressure stream of substantially pure oxygen and a separate stream of nitrogen having a purity of at least 98 vol.% by means of an air separation unit;
(2) introducing a first portion of said nitrogen stream at low pressure into a size reduction zone to pneumatically transport ground, solid carbonaceous fuel particles produced therein into a gas-solid separator, removing low pressure nitrogen overhead from said separator and recycling at least a portion of said nitrogen to said size reduction zone; wherein said solid carbonaceous fuel is selected from anthacite and bituminous coal having a moisture content in the range of about 2 to 10 weight percent, and sub-bituminous coal and lignite having a moisture content up to 30 weight percent, and said ground solid fuel has a particle size so that 100% passes through an ASTM E11-70 Sieve Designation Standard 425 μm and at least 80% passes through an ASTM E11-70 Sieve Designation Standard 75 μm;
(3) discharging said ground, solid carbonaceous fuel particles from said separator into a lock hopper from which low pressure nitrogen gas is discharged, passing said particles of solid fuel into a run tank that is pressurized by a separate portion of nitrogen gas from (1) at high pressure, and metering the particles of solid fuel from said run tank into a mixing zone, and mixing and entraining said particles of solid fuel in a second portion of said nitrogen from (1) at high pressure to produce a solid fuel-nitrogen gaseous dispersion having a weight ratio of nitrogen to solid carbonaceous fuel in the range of about 0.3 to 0.9;
(4) introducing a conical stream of said solid fuel-nitrogen gaseous dispersion into the reaction zone of a single freeflow partial oxidation non-catalytic gas generator by way of the annulus passage of an annulus-type burner at a velocity in the range of about 25 to 100 feet per second simultaneously with a stream of said substantially pure oxygen which is passed through the center conduit of said burner at a velocity in the range of about 110 feet per second to 75% of sonic velocity, said streams impinging against each other in the reaction zone producing a uniform dispersion of oxygen, coal particles, and nitrogen, and the ratio of the atoms of free-oxygen plus the atoms of organically combined oxygen in the solid carbonaceous fuel per atom of carbon in the solid carbonaceous fuel is in the range of about 0.7 to 1.2; wherein supplemental $H_2O$ in the amount of about 0 to 0.15 lbs. of $H_2O$ per lb. of carbonaceous fuel is introduced into said reaction zone;
(5) reacting said solid fuel and oxygen together by partial oxidation at a temperature in the range of about 1800° to 3000° F. and a pressure in the range of about 5 to 300 atmospheres and a residence time in the range of about 1 to 10 seconds to produce a stream of raw synthesis gas comprising in mole % dry basis; $H_2$ 5 to 30, CO 35 to 70, $N_2$ 5 to 25, $CO_2$ 4 to 20, $CH_4$ 0.01 to 3.0, $H_2S$ plus COS 0 to 2, A nil to 0.5, and containing $H_2O$, particulate carbon, and ash;
(6) cooling said raw synthesis gas and cleaning same by removing ash and particulate carbon, while introducing $H_2O$;
(7) reacting $H_2O$ and CO in the process gas stream from (6) by water-gas shift to produce additional $H_2$ and $CO_2$ while simultaneously reacting $H_2$ and COS to produce $H_2S$ and CO;
(8) drying and separating out the following gas streams in a gas purification zone
 (a) a dry gas stream substantially comprising $H_2$, $N_2$, CO, $CH_4$, and A;
 (b) a dry $CO_2$-rich gas stream;
 (c) a dry $H_2S$-rich gaseous stream;
(9) removing CO, $CH_4$, nand A from the dry gas stream from (8) (a) in a final gas purification zone including washing with liquid nitrogen from (1) to produce an ammonia synthesis gas stream comprising $N_2$ and $H_2$ in the stoichiometric ratio in the range of about 2.5 to 3.5 for cataytic reaction together to produce ammonia;
(10) introducing the ammonia synthesis gas from step (9) into a catalytic reactor where, at a temperature in the range of about 250° to 1202° F. and a pressure in the range of about 100 to 1000 atmospheres $H_2$ and $N_2$ are reacted together to produce $NH_3$,
(11) reacting together stoichiometric amounts of the $NH_3$ from (10) and said $CO_2$-rich gas streams from (8) (b) at a pressure in the range of about 120 to 200 atmospheres and a temperature in the range of about 320° to 356° F. to produce urea and water; and
(12) separating said urea from said water.

16. A process for producing ammonium bicarbonate comprising:
(1) separating air into a high pressure stream of substantially pure oxygen and a separate stream of nitrogen having a purity of at least 98 vol.% by means of an air separation unit;
(2) introducing a first portion of said nitrogen stream at low pressure into a size reduction zone to pneumatically transport ground, solid carbonaceous fuel particles produced therein into a gas-solid separator, removing low pressure nitrogen overhead from said separator and recycling at least a portion of said nitrogen to said size reduction zone; wherein said solid carbonaceous fuel is selected from anthacite and bituminous coal having a moisture content in the range of about 2 to 10 weight percent, and sub-bituminous coal and lignite having a moisture content up to 30 weight percent, and said ground solid fuel has a particle size so that 100% passes through an ASTM E11-70 Sieve Designation Standard 425 μm and at least 80% passes through an ASTM E11-70 Sieve Designation Standard 75 μm, (3) discharging said ground, solid carbonaceous fuel particles from said separator into a lock hopper from which low pressure nitrogen gas is discharged, passing said particles of solid fuel into a run tank that is pressurized by a separate portion of nitrogen gas from (1) at high pressure, and metering the particles of solid fuel from said run tank into a mixing zone, and mixing and entraining said particles of solid fuel in a second portion of said nitrogen from (1) at high pressure to produce a solid fuel-nitrogen gaseous dispersion having a weight ratio of nitrogen to solid carbonaceous fuel in the range of about 0.3 to 0.9;

(4) introducing a conical stream of said solid fuel-nitrogen gaseous dispersion into the reaction zone of a single freeflow partial oxidation non-catalytic gas generator by way of the annulus passage of an annulus-type burner at a velocity in the range of about 25 to 100 feet per second simultaneously with a stream of said substantially pure oxygen which is passed through the center conduit of said burner at a velocity in the range of about 110 feet per second to 75% of sonic velocity, said streams impinging against each other in the reaction zone producing a uniform dispersion of oxygen coal particles, and nitrogen, and the ratio of the atoms of free-oxygen plus the atoms of organically combined oxygen in the solid carbonaceous fuel per atom of carbon in the solid carbonaceous fuel is in the range of about 0.7 to 1.2; wherein supplemental $H_2O$ in the amount of about 0 to 0.15 lbs. of $H_2O$ per lb of carbonaceous fuel is introduced into said reaction zone;

(5) reacting said solid fuel and oxygen together by partial oxidation at a temperature in the range of about 1800° to 3000° F. and a pressure in the range of about 5 to 300 atmospheres and a residence time in the range of about 1 to 10 seconds to produce a stream of raw synthesis gas comprising in mole % dry basis: $H_2$ 5 to 30, CO 35 to 70, $N_2$ 5 to 25, $CO_2$ 4 to 20, $CH_4$ 0.01 to 3.0, $H_2S$ plus COS 0 to 2, A nil to 0.5, and containing $H_2O$, particulate carbon, and ash;

(6) cooling said raw synthesis gas and cleaning same by removing ash and particulate carbon, while introducing $H_2O$;

(7) reacting $H_2O$ and CO in the process gas stream from (6) by water-gas shift to produce additional $H_2$ and $CO_2$ while simultaneously reacting $H_2$ and COS to produce $H_2S$ and CO;

(8) drying and separating out the following gas streams in a gas purification zone
  (a) a dry gas stream substantially comprising $H_2$, $N_2$, CO, $CH_4$, and A;
  (b) a dry $CO_2$-rich gas stream;
  (c) a dry $H_2S$-rich gaseous stream;

(9) removing CO, $CH_4$, and A from the dry gas stream from (8) (a) in a final gas purification zone including washing with liquid nitrogen from (1) to produce an ammonia synthesis gas stream comprising $N_2$ and $H_2$ in the stoichiometric ratio in the range of about 2.5 to 3.5 for catalytic reaction together to produce ammonia;

(10) introducing the ammonia synthesis gas from step (9) into a catalytic reactor where, at a temperature in the range of about 250° to 1202° F. and a pressure in the range of about 100 to 1000 atmospheres $H_2$ and $N_2$ are reacted together to produce $NH_3$,

(11) passing said $CO_2$-rich gas stream from (8) (b) through aqueous ammonia solution prepared from $NH_3$ from (10) in an absorption zone to precipitate ammonium bicarbonate; and

(12) filtering, washing, and drying said ammonium bicarbonate.

* * * * *